US009674460B1

(12) United States Patent
Robertson et al.

(10) Patent No.: US 9,674,460 B1
(45) Date of Patent: Jun. 6, 2017

(54) GENERATING HIGH-DYNAMIC RANGE IMAGES USING VARYING EXPOSURES

(71) Applicant: Google Inc., Mountain View, CA (US)

(72) Inventors: Mark Allen Robertson, Cupertino, CA (US); Ken James Kryda, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 14/945,893

(22) Filed: Nov. 19, 2015

(51) Int. Cl.
*H04N 5/235* (2006.01)

(52) U.S. Cl.
CPC ......... *H04N 5/2355* (2013.01); *H04N 5/2353* (2013.01)

(58) Field of Classification Search
CPC .................................. H04N 5/2356
USPC ...................................... 348/221.1
See application file for complete search history.

(56) References Cited

U.S. PATENT DOCUMENTS

| | | | |
|---|---|---|---|
| 7,239,805 B2 | 7/2007 | Uyttendaele et al. | |
| 8,305,487 B2 | 11/2012 | Cha et al. | |
| 8,446,481 B1 | 5/2013 | Geiss | |
| 8,711,452 B2 | 4/2014 | Hamilton, Jr. et al. | |
| 2009/0059039 A1* | 3/2009 | Smith | H04N 5/35581 348/241 |
| 2010/0310190 A1* | 12/2010 | Lin | H04N 5/35509 382/260 |
| 2013/0027589 A1* | 1/2013 | Johansson | G06T 5/40 348/241 |
| 2013/0044237 A1 | 2/2013 | Ikizyan et al. | |
| 2013/0100314 A1 | 4/2013 | Li et al. | |
| 2014/0263951 A1 | 9/2014 | Fan | |
| 2014/0347521 A1 | 11/2014 | Hasinoff et al. | |
| 2015/0097978 A1* | 4/2015 | Lee | H04N 5/2355 348/208.6 |
| 2015/0097990 A1* | 4/2015 | Manabe | H04N 5/23245 348/241 |
| 2015/0312460 A1* | 10/2015 | Benderius | H04N 5/2353 348/364 |

FOREIGN PATENT DOCUMENTS

EP   2 778 635   9/2014

OTHER PUBLICATIONS

Hasinoff et al., "Noise-Optimal Capture for High Dynamic Range Photography", IEEE Conference on Computer Vision and Pattern Recognition, Jun. 13-18, 2010, San Francisco, California, pp. 553-560.*

(Continued)

*Primary Examiner* — Anthony J Daniels
(74) *Attorney, Agent, or Firm* — Dority & Manning, P.A.

(57) ABSTRACT

Systems and methods are provided for generating high-dynamic range images. In particular, a signal-to-noise (SNR) ratio objective associated with an imaging platform configured to capture one or more images of a region of interest can be determined. The SNR objective can specify a desired signal-to-noise ratio behavior as a function of a brightness of the region of interest. An exposure profile associated with the imaging platform can then be determined based at least in part on the SNR objective. Data indicative of a plurality of image frames, each depicting at least a portion of the region of interest, can then be obtained. The plurality of image frames being captured by the imaging platform in accordance with the exposure profile.

14 Claims, 10 Drawing Sheets

(56) References Cited

OTHER PUBLICATIONS

Chen et al., "Optimal Scheduling of Capture Times in a Multiple-Capture Imaging System", SPIE-International Society for Optical Engineering Proceedings, Vol. 4669, Apr. 26, 2002, pp. 288-296.
Cook et al., "A Reflectance Model for Computer Graphics", ACM Transactions on Graphics, vol. I, No. 1, Jan. 1982, pp. 7-24.
International Search Report for PCT/US2016/062406 mailed on Mar. 8, 2017. 17 pages.
Granados et al., "Optimal HDR Reconstruction with Linear Digital Cameras.", 2010 IEEE Conference on Computer Vision and Pattern Recognition, San Francisco, CA, Jun. 13-18, 2010, pp. 215-222.

* cited by examiner

GENERATING HIGH-DYNAMIC RANGE IMAGES USING VARYING EXPOSURES

FIELD

The present disclosure relates generally to generating images, and more particularly to systems and methods for generating high-dynamic range images.

BACKGROUND

Scenes captured, for instance, from overhead imaging platforms can have a high-dynamic range. For instance, details in one region of the scene can be obscured in a shadow, while details in another region of the scene may be associated with a highly reflective rooftop. It can be difficult to capture the entire dynamic range of a scene in an image depicting the scene. For instance, high light areas of the scene may be saturated, or the low light areas may be too noisy, or both. Conventional techniques for capturing high-dynamic range images include combining multiple pictures taken at different exposures. For instance exposure bracketing techniques can be used to capture high-dynamic range images of a scene.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of creating high-dynamic range images. The method includes determining, by one or more computing devices, a signal-to-noise ratio objective associated with an imaging platform configured to capture one or more images of a region of interest. The signal-to-noise ratio objective specifies a desired signal-to-noise ratio behavior as a function of a brightness of the region of interest. The method further includes determining, by the one or more computing devices, an exposure profile associated with the imaging platform based at least in part on the signal-to-noise ratio objective. The method further includes obtaining, by the one or more computing devices, data indicative of a plurality of image frames, each depicting at least a portion of the region of interest, the plurality of image frames being captured by the imaging platform in accordance with the exposure profile. The method further includes generating, by the one or more computing devices, a high-dynamic range image of at least a portion of the region of interest based at least in part on the plurality of image frames.

Other example aspects of the present disclosure are directed to systems, apparatus, tangible, non-transitory computer-readable media, user interfaces, memory devices, and electronic devices for creating high-dynamic range images.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
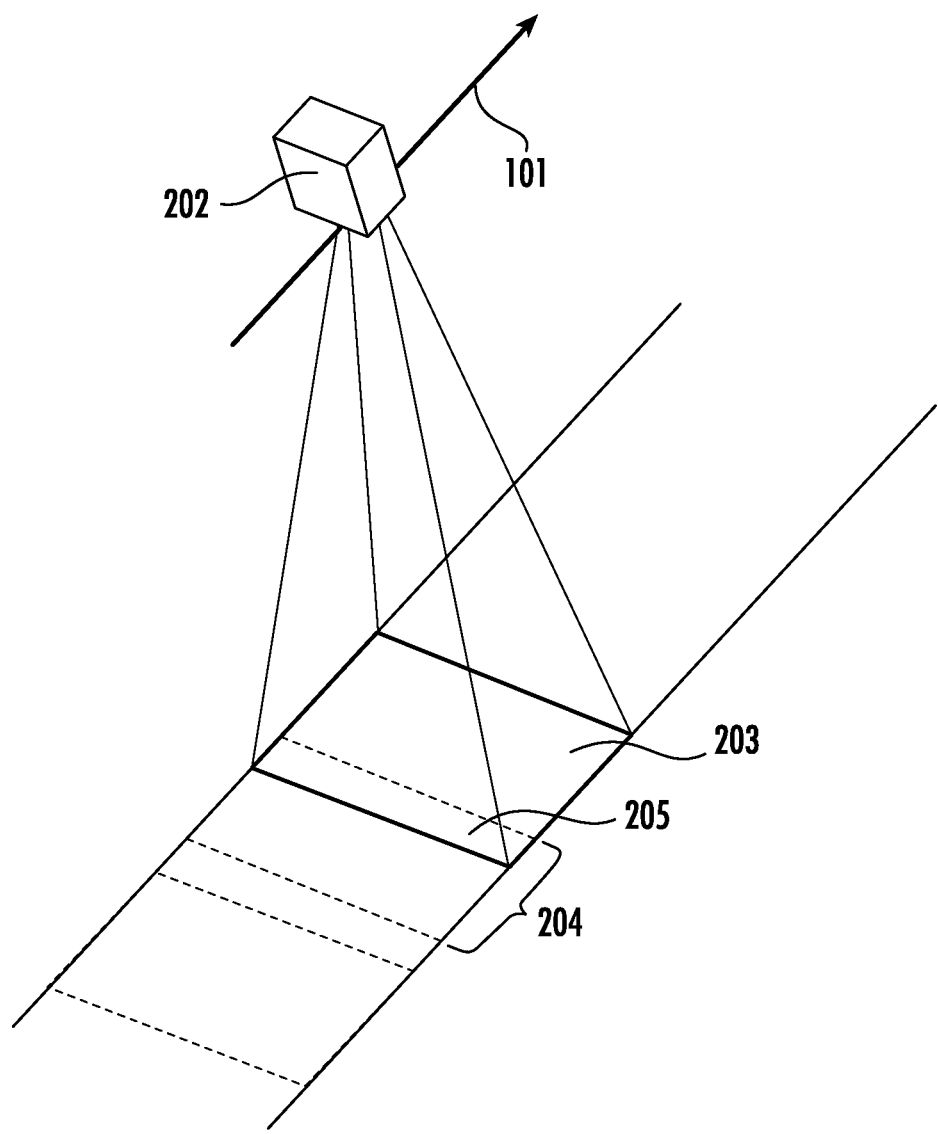
FIG. 1 depicts an example imaging platform according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to creating high-dynamic images. For instance, a signal-to-noise (SNR) objective can be determined. The SNR objective can be associated with an imaging platform configured to capture one or more images of a region of interest. The SNR objective can specify a desired SNR curve relative to a brightness intensity associated with the region of interest. An exposure profile can then be determined based at least in part on the SNR objective. A plurality of image frames can then be captured, each depicting at least a portion of the region of interest. For instance, the plurality of image frames can be captured by exposing an image capture device associated with the imaging platform in accordance with the exposure profile. One or more of the captured image frames can then be combined to generate a high-dynamic range image of at least a portion of the region of interest.

More particularly, the imaging platform may be an overhead imaging platform, such as a satellite, an airplane, a helicopter, an unmanned aerial vehicle (UAV), a drone, a balloon, etc. The imaging platform may be configured to travel in a path over the region of interest called a track. The path may include one or more straight lines or segments or may be a curved path. For instance, the overhead imaging platform can be flown at a height over the region of interest. The imaging platform can be configured to obtain a plurality of image samples or frames during the travel of the platform along the path. In some implementations, the image frames can be captured in a continuous, rapid succession. The image frames can then be assembled into an output image on the ground via digital processing.

In some implementations, the SNR objective can correspond to one or more applications associated with image capture by the imaging platform. Various imaging applications may require various SNR responses associated with the captured image frames. For instance, the SNR response may specify SNR as a function of the brightness of the scene captured by the images. In this manner, the SNR may be plotted as an SNR curve relative to scene brightness. In some implementations, the scene brightness can be associated with a scene reflectivity. Example SNR objectives can include maintaining a substantially uniform SNR relative to scene brightness. For instance, such SNR objective can include maintaining the SNR within a predetermined SNR range. As another example the SNR objective can specify a minimum SNR that the SNR cannot fall below. For instance, a minimum SNR can be set for one or more brightness ranges.

Other example SNR objectives can include shaping the SNR curve in accordance with a brightness distribution. For instance, the brightness distribution can correspond to distribution of brightness of a region of interest. In some implementations, the brightness can be a predetermined brightness distribution. For instance, the brightness distribution can be an expected brightness distribution. In this manner, the brightness distribution may be determined based at least in part on a location of the imaging platform relative to the earth, a location of the sun relative to the earth, an albedo associated with the region of interest, atmospheric absorption, an expected reflectance of one or more areas within the region of interest, expected atmospheric conditions and/or other suitable factors. In some implementations, the brightness distribution may be determined at least in part from one or more additional images depicting the region of interest. As another example, the brightness distribution can be determined and/or modified dynamically as part of a feedback loop. For instance, one or more images captured by the imaging platform can be analyzed to determine an expected brightness distribution of one or more subsequent images to be captured as part of the same image capturing session.

Once the SNR objective is determined, an exposure profile can be determined based at least in part on the SNR objective. The exposure profile can include a plurality of exposure or integration times to be used in capturing image frames of the region of interest by the imaging platform. In some implementations, the exposure profile can specify a number of image frames to be captured and an integration time for each image frame to be captured. For instance, the number of frames to be captured can be modified by adjusting a frame capture rate and/or adjusting a scanning rate. The integration times can be determined such that when a plurality of image frames are captured using the integration times of the exposure profile, approximately corresponds to the SNR objective. In this manner, the integration times can be selected to provide a desired SNR behavior in the plurality of image frames. In some implementations, the exposure profile may be determined based at least in part on one or more image capture device(s). For instance, the exposure profile may be determined based at least in part on noise characteristics of the image capture device(s), dynamic range of the image capture device(s), response linearity of the image capture device(s) and/or various other suitable factors associated with the image capture device(s).

As indicated, the imaging platform can be configured to travel along a predetermined path above the region of interest. As the imaging platform travels over the region of interest, the imaging platform can be configured to capture a plurality of image frames each depicting at least a portion of the region of interest. For instance, the plurality of image frames can be captured by one or more image capture devices associated with the imaging platform. For instance, the image capture device(s) may include one or more imaging sensors mounted to the imaging platform. Such sensors may include line scan sensors, time delay integration (TDI) sensors, two-dimensional (2D) staring sensors, color wheel type 2D staring sensors, color filter array (CFA) sensors, and/or various other suitable sensors.

For instance, in implementations wherein a 2D staring sensor is used, the sensor can be configured to scan the region of interest and to acquire entire 2D frames taken as snapshots while the platform travels along the track. For instance, staring sensor imaging systems can be designed such that neighboring images contain overlapping measurements of the region of interest. The presence of overlapping regions in the output images allows for later image processing to register neighboring image frames and combine the images together to reconstruct an image of the region of interest.

In particular, each image frame can be acquired in accordance with the determined exposure profile. For instance, an image frame can be captured by exposing the image capture device for the designated integration time as specified by the exposure profile. In some implementations, each image frame can be captured using a different integration time. In implementations wherein successive image frames contain overlapping portions, each point on the ground in the region of interest may be captured in multiple image frames having different integration times. In this manner, the point as observed by multiple image frames can have multiple associated SNRs. The plurality of image frames captured in accordance with the exposure profile can then be combined to yield a desired SNR response (e.g. SNR curve). In particular, in some implementations, combining the image frames may be used to generate a high-dynamic range image having the desired SNR response.

According to other example aspects of the present disclosure, one or more integration times can be determined for multiple portions of the imaging sensor. For instance, an SNR objective may be determined, and a first integration time associated with a first portion of the image sensor and a second integration time associated with a second portion of the image sensor can be determined based at least in part on the SNR objective. A plurality of image frames can then be captured and at least a portion of the image frames can be combined in accordance with the SNR objective.

More particularly, in some implementations, the image capture device(s) associated with the imaging platform can include one or more panchromatic components and one or more multispectral components. For instance, in some implementations, a single monolithic (or unitary) imaging sensor may be used. The single imaging sensor may include one or more panchromatic blocks and one or more multispectral blocks. In such instances, the panchromatic and multispectral blocks may be implemented as filters disposed between the imaging sensor and the region of interest. For instance, the filters may be formed, mounted or otherwise attached on a single, monolithic substrate.

In some implementations, the multispectral block may include one or more spectral filters configured to transmit light within a range of wavelengths. For instance, the multispectral block may include a red spectral filter, a blue spectral filter, a green spectral filter, an infrared spectral filter, a near infrared spectral filter, etc. The panchromatic filter(s) may have a broader spectral bandwidth than the spectral filters. For instance, in some implementations, the panchromatic filter can have a bandwidth that is as large as two, three, or more (e.g., all) of the spectral filters.

In other implementations, the imaging sensor may include multiple photosensors. For instance, the panchromatic filter(s) can be disposed over a first sensor, and the spectral filter(s) can be disposed over a second sensor. In other implementations, a different sensor can be used for each spectral or panchromatic filter. The different imaging sensors can, in some cases, have different pixel arrangements.

In such implementations wherein the imaging sensor(s) include panchromatic and multispectral components, the integration times used to capture images can be optimized based at least in part on the panchromatic and/or multispectral components. Because the spectral filters pass only a fraction of the total energy incident upon them, an exposure time that will saturate the panchromatic filter may not saturate the spectral filters. In this manner, one or more integration times can be selected such that the panchromatic filter improves the signal in the darker regions of the scene, while saturating the high lights of the scene. The high lights may then be recovered by the spectral filters.

In example implementations, a single integration time may be selected for the entire sensor (e.g. the panchromatic block and the multispectral block), or an integration time may be selected for each block and/or filter. In implementations wherein each block has a different integration time, the blocks may be configured to expose simultaneously or at different times when capturing image frames. For instance, in some implementations, the individual blocks may be exposed in a serial manner. The integration times may be determined based at least in part on a desired SNR objective. For instance, as indicated above, the integration times may be determined to shape an SNR curve relative to scene brightness.

As described above, a plurality of image frames depicting at least a portion of the region of interest can be captured. For instance, the imaging sensors can capture successive, overlapping snapshots of the region of interest, such that each point in the region of interest is captured multiple times. In particular, each point may be captured one or more times by the panchromatic portion of the imaging sensor, and one or more times by the multispectral portion. In some implementations, each point may be captured one or more times by each spectral filter in the spectral portion of the imaging sensor. Each image frame may be captured by exposing the sensor(s) in accordance with the determined integration times. For instance, in implementations wherein the multispectral portion and the panchromatic portion of the imaging sensor have different associated integration times, each portion may be configured to expose in accordance with the respective integration times, either simultaneously or in a serial manner.

At least a portion of the captured image frames can then be combined in accordance with the desired SNR objective. For instance, the image frames can be combined to achieve a desired SNR response relative to scene brightness. In some implementations, the image frames may be combined to generate a high-dynamic range image.

In alternative implementations, a neutral density filter can be used. A neutral density filter can be configured to reduce or modify the intensity of all wavelengths or colors of light passing through the filter in an equal manner, giving no changes in hue of color rendition. The neutral density filter may be disposed between at least a portion of the imaging sensor(s) and the region of interest. For instance, the neutral density filter can be formed, mounted or otherwise attached to the sensor(s). In example implementations, the neutral density filter can be a fixed region neutral density filter or a graduated neutral density filter (e.g. light intensity varies across the surface). In some implementations, multiple neutral density filters may be used having one or more optical densities.

In such implementations, one or more integration times can be determined based at least in part on the neutral density filter. For instance, the one or more integration times can be determined based at least in part on the size of the neutral density filter, the position of the neutral density filter relative to the imaging sensor, the optical density of the neutral density filter, etc. When capturing images, each point in the region of interest will be seen with full brightness in some frames, and reduced brightness in other frames (e.g. frames captured when the neutral density filter is disposed between the point and the sensor). In this manner, the integration time(s) can be determined such that bright areas in the region of interest will saturate in images captured by the portion of the sensor not having the neutral density filter, but dark areas will yield an improved SNR. The bright areas will then be correctly captured when observed in the neutral density filter portion of the sensor.

It will be appreciated that various example aspects of the present disclosure can be implemented as standalone features, or in combination with one or more other example aspects of the present disclosure. For instance, an exposure profile can be determined for an imaging sensor having only a panchromatic portion, an imaging sensor having a panchromatic and multispectral portion, and/or an imaging sensor having a neutral density filter in accordance with example embodiments of the present disclosure. As another example, the integration times determined for a multispectral portion and/or neutral density portion of an imaging sensor may be determined based at least in part on a desired SNR objective. For instance, such integration times may be dynamically generated or modified based at least in part on one or more current image frames captured by the imaging platform.

With reference now to the figures, example aspects of the present disclosure will be discussed in greater detail. For instance, FIG. 1 depicts an example imaging platform 202 according to example embodiments of the present disclosure. Imaging platform 202 may be configured to use one or more 2D staring sensors to acquire entire 2D frames taken as snapshots while the platform travels along a track 101 over a region of interest. In some implementations, imaging platform 202 can be configured such that neighboring images contain overlapping measurements of the region of interest. For instance, the presence of overlapping regions in the output images allows for later image processing to register neighboring image frames and mosaic the images together to reconstruct an image of the region of interest.

In particular, imaging platform 202 can acquire an entire two-dimensional image frame 203 in a single snapshot. Staring sensors can be configured to capture images in rapid succession. For instance, an image can be captured sequentially through the capture or acquisition of many different image frames (e.g. image frames 203, 204), each of which can have some amount of overlap 205 with the image frames before and/or after it. In some implementations, the imaging region of a staring sensor may be thought of as a two-dimensional surface area. Light can be collected and bundled into individual pixels, whereby the number of pixels relative to the surface area of the image region determines the resolution of the staring sensor. In various embodiments, the staring sensor can comprise a complementary metal-oxide-semiconductor (CMOS) sensor or a charge coupled device (CCD) sensor. The staring sensor can include an array of photodiodes. In some embodiments, the staring sensor includes an active-pixel sensor (APS) comprising an integrated circuit containing an array of pixel sensors. Each pixel sensor can include a photodiode and an active amplifier. For some overhead imaging implementations, the staring sensor (and/or other components of an overhead imaging platform) may be radiation hardened to make it more resistant to damage from ionizing radiation in space.

As indicated, imaging platform 202 can be configured such that neighboring image frames 203, 204 contain overlapping measurements of the region of interest (e.g., the overlap 205). In addition, as indicated above, each image frame can be captured using a predetermined integration time. For instance, in some implementations, an exposure profile can be determined specifying an integration time associated with each image frame to be captured. In other implementations, one or more integration times can be determined for one or more portions of the imaging sensor associated with imaging platform 202. The integration times can be determined based at least in part on an SNR objective. The presence of overlapping regions in the output images allows for later image processing to register neighboring image frames and to combine the images together to reconstruct a more accurate image of the region of interest. In some implementations, the images can be combined to shape an SNR curve to correspond to the SNR objective. In addition, by combining many separate similar image frames together, the final reconstructed image captured by a staring sensor can correct for deviations in the motion of the imaging platform from the expected direction of travel 101, including deviations in speed and/or direction.

In some implementations, imaging platform 202 may further include a color wheel sensor, a color filter array (CFA), such as a Bayer filter, a panchromatic channel (e.g. panchromatic filter or panchromatic sensor), one or more spectral channels (e.g. spectral sensor or spectral filter), etc. For instance, imaging platform 202 may include an imaging sensor having a panchromatic block adjacent to a multispectral block. In alternative implementations, imaging platform 202 can include a one-dimensional line sensor, such as a TDI sensor. A line scan sensor can be a sensor having a single row of pixels for each color to be collected. The sensor is positioned in the platform so as to be perpendicular to the track direction thus moving in a linear manner across a scene. Each row of pixels in an image is exposed in sequence as the sensor moves across the scene, thus creating a complete 2D image. An overhead imaging platform that captures images with multispectral (e.g., multiple color) information may use an independent line scan sensor for each spectrum (e.g., color band) to be captured, wherein each line scan sensor is fitted with a different spectral filter (e.g., color filter).

Figure 2:
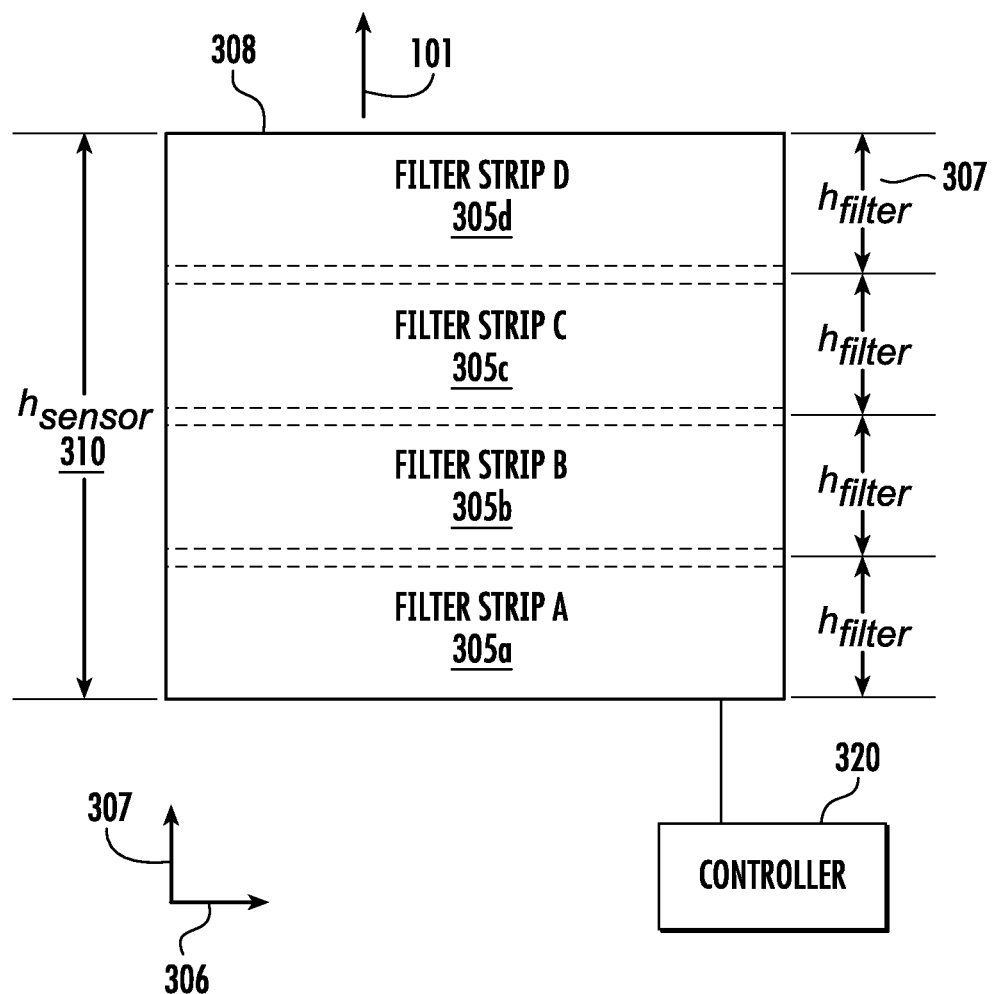
FIGS. 2-3 depict example imaging sensor configurations according to example embodiments of the present disclosure.

FIG. 2 depicts an example filter configuration for a two-dimensional multispectral staring sensor 300 that includes spectral filter strips 305a, 305b, 305c, and 305d, according to example embodiments of the present disclosure. In particular, the sensor 300 includes a block 308 of a plurality of spectral filter strips 305a-305d. In this example, the spectral filter strips 305a-305d are shaped in a long, narrow manner spanning the axis or surface area of the staring sensor 300. The spectral filter strips 305 can be disposed relative to the surface of the staring sensor 300 such that the filter strips 305a-305d are disposed between the surface of the sensor and the region of interest to be captured in an image. The region of interest may include, for example, a portion of the surface of the earth that is to be imaged from an imaging platform. Light from the region of interest can pass through the filter strips 305a-305d before being detected by photosensitive elements of the staring sensor. The strips 305a-305d may be formed over or on the staring sensor or may be attached or bonded to the staring sensor. For example, the strips 305a-305d may be bonded to a ceramic carrier or substrate for the staring sensor.

As shown in FIG. 2, the structure of the staring sensor 300 can be described with reference to two perpendicular axes 306, 307, with the axis 307 in the expected direction of travel 101 of the overhead platform. For instance, the filter strips 305a-305d are oriented perpendicular to the axis 307 in the direction of travel 101. Each strip 305a-305d can have a longitudinal axis that is oriented perpendicular to the axis 307 in the direction of travel 101 of the overhead platform. As will be further described below, each filter strip can have a height in the direction 307. In some embodiments, the width of the filter strips along the direction 306 (perpendicular to the direction of motion 101) can be substantially the same as the length of the staring sensor in that direction, such that the filter strips substantially cover the surface of the staring sensor 300.

In one example embodiment, the sensor comprises at least four spectral filter strips (e.g., red, green blue, infrared). Other embodiments may have various other suitable numbers of filter strips. The spectral filter strips 305 can be shaped roughly as rectangles (e.g., as shown in FIG. 2) or as parallelograms, squares, polygons, or any other suitable shape. In various embodiments, the filter strips cover substantially the entire surface of the staring sensor.

Each spectral filter strip can be configured to transmit light within a range of wavelengths. For example, a blue spectral filter strip can be configured to transmit wavelengths of light centered around the color blue (e.g., 450-475 nm). Wavelengths of light outside the range transmitted by a filter are blocked, so that light outside the transmitted range is not collected by the pixels of the staring sensor that are "below" the filter strip. The range of wavelengths transmitted by each filter may vary. The range of wavelengths transmitted by a particular filter strip may or may not overlap, at least partially, with the range of wavelengths transmitted by other filter strips, depending upon the embodiment. In addition to red (R), green (G), blue (B), and infrared (IR) filters as illustrated, there are many other possible wavelength ranges that may be transmitted by a spectral filter, for example cyan, yellow, magenta, or orange. Infrared filters can include near, mid, or far infrared filters. In some implementations, ultraviolet filters can be used. In some implementations, the wavelength ranges (or bandwidths) for the filter strips are selected to cover at least a portion of a desired spectral range, e.g., a visible spectral range, an infrared spectral range, an ultraviolet spectral range, or a combination of such spectral ranges. In some implementations, the spectral range of the filter strips 305a-305d is between about 450 nm to about 900 nm. In some implementations, the filter bandwidths can be less than about 20 nm, less than about 50 nm, less than about 100 nm, less than about 150 nm, less than about 200 nm, or some other range. Additionally, the ordering of spectral filters (as well as placement in relation to a panchromatic sensor, if used) along the direction of relative motion 101 is arbitrary, and as a consequence any order of the filter strips may be used.

In some embodiments, the height 307 of the filter strips along their short edges hfilter is between one and four times a minimum filter height. In one embodiment, the minimum filter height can correspond to the velocity of a point on the ground as seen by the sensor as it moves in the direction of travel 101, divided by a frame rate at which the staring sensor 300 (and/or the imaging electronics such as controller 320) captures image frames. In some embodiments, the controller 320 may be integrated with the sensor 300, which may simplify packaging and use with an imaging system. The controller 320 can be used or integrated with any of the embodiments of the sensor 300 described herein to electronically control image or video capture by the sensor 300.

Although FIG. 2 illustrates the staring sensor 300 having filter strips 305a-305d that each have the same height 307, this is for purposes of illustration and is not intended to be limiting. In other implementations, the heights of some or all of the filter strips can be different from each other.

In addition to a two dimensional staring sensor, the sensor optionally may also include a panchromatic block for capturing panchromatic image data in addition to the multispectral image data captured via the filter strips 305a-305d of the staring sensor. The panchromatic block can be sensitive to a wide bandwidth of light as compared to the bandwidth of light transmitted by one or more of the spectral filter strips. For example, the panchromatic block may have a bandwidth that substantially covers at least a substantial portion of the combined bandwidths of the spectral filter strips. In various embodiments, the bandwidth of the panchromatic block may be greater than about 50 nm, greater than about 100 nm, greater than about 250 nm, or greater than about 500 nm. In one implementation, the bandwidth of the panchromatic block is between about 450 nm and about 900 nm. In various implementations, the bandwidth of the panchromatic block can be greater than about two, greater than about three, greater than about four, or greater than about five times the bandwidth of a spectral filter strip.

Figure 3:
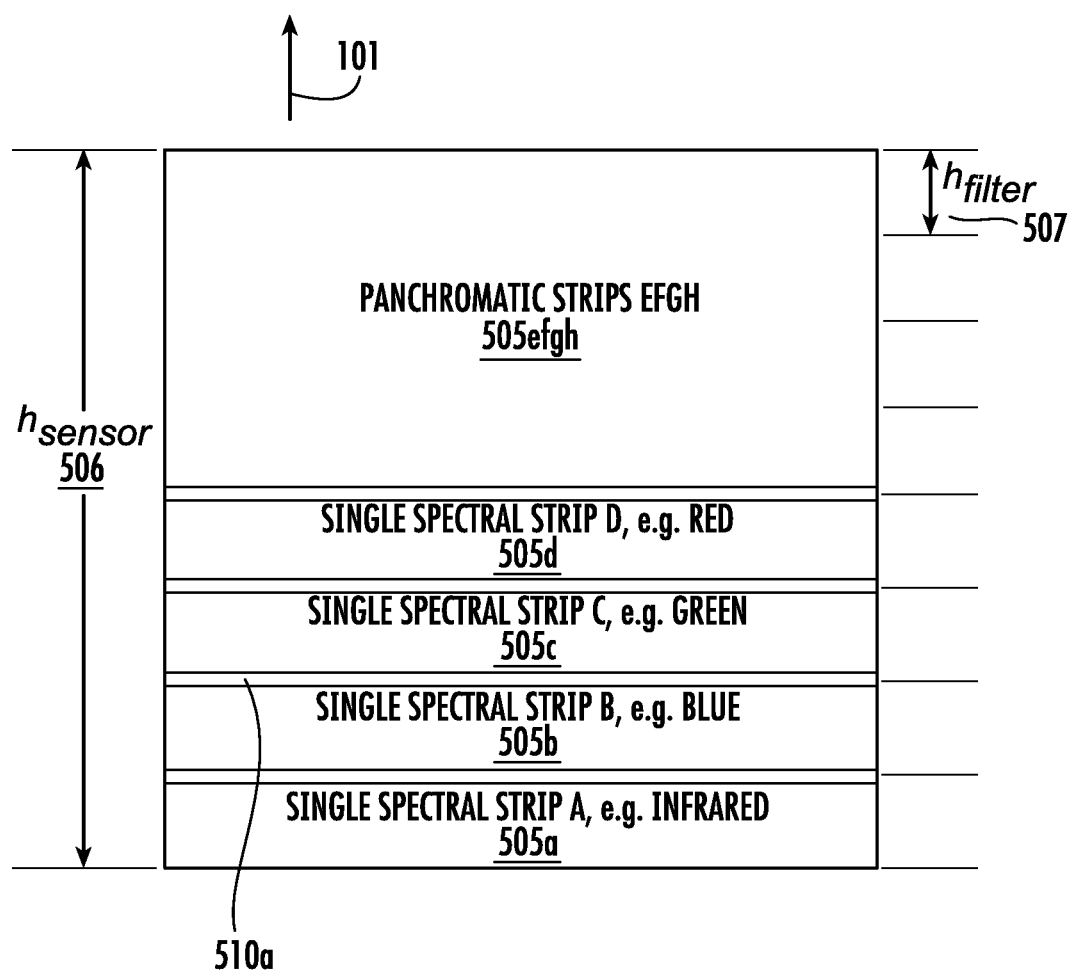

FIG. 3 depicts an example sensor including a two dimensional staring sensor 400 with spectral filter strips 505a-505d and a panchromatic block 505efgh, according to example embodiments of the present disclosure. As shown, the panchromatic block (505efgh) is the same width (perpendicular to direction of relative motion 508) as each individual spectral filter strip (e.g., infrared 505a, blue 505b, green 505c, red 505d), but is four times the height 507 (parallel to the direction of motion 101) of any of the individual spectral filter strips 505a-505d. The height of the panchromatic block relative to the height of the spectral filter strips may vary in various implementations. For instance, the width and height of the panchromatic block may be determined based on the direction of relative motion 101 of the imaging platform, where height is parallel to the direction of relative motion 101, and width is perpendicular to the direction of relative motion 101.

FIG. 3 depicts gaps (e.g. 510a) between the spectral filter strips and panchromatic strips. It will be appreciated that such gaps may be any suitable size. It will further be appreciated that, in some implementations, such gaps may not be included at all. The total height 506 of this embodiment of the staring sensor 400 can correspond to the sum of the heights of the panchromatic block 505efgh, the spectral strips 505a-505d, and the gaps 510 (if included).

Although the panchromatic block 505efgh includes a single panchromatic filter, it will be appreciated that, in some implementations, the panchromatic block 505efgh may include a plurality of panchromatic strips having various suitable proportions. In some implementations, all portions of the spectral sensor(s) and panchromatic sensor(s) imaging areas may have the same pixel size, pixel shape, pixel grid or array placement, and/or pixel density. However, in some cases individual portions of the sensors may have differing pixel sizes, shapes, grid or array placements, and/or densities.

As indicated above, in some embodiments, an imaging sensor can include a single (e.g., monolithic) two-dimensional staring sensor, where different portions of the sensor capture different data based on the spectral filters and/or panchromatic filters. In other embodiments, multiple staring sensors can be used. For example, the panchromatic strip(s) can be disposed over a first photosensor, and the spectral filter strip(s) can be disposed over a second photosensor. In other implementations, a different photosensor is used for each spectral or panchromatic strip. The different photosensors can, in some cases, have different pixel arrangements. In other embodiments, the staring sensor may be replaced by other types of spectral sensors such as line scanners (including TDI), color wheels, and CFA sensors.

Figure 4:
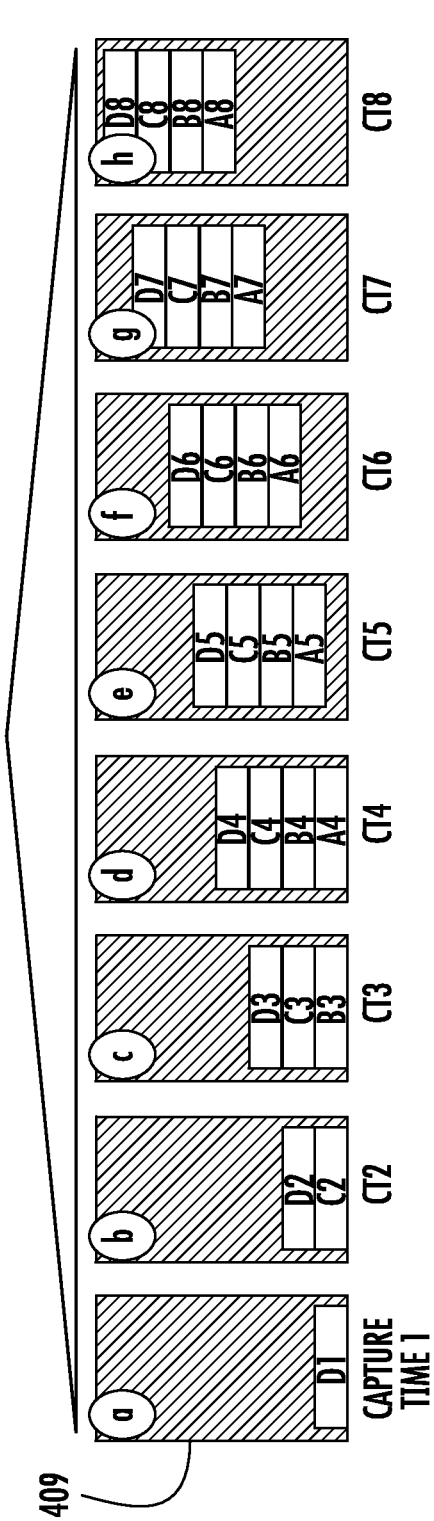
FIG. 4 depicts an example image acquisition sequence according to example embodiments of the present disclosure.

FIG. 4 depicts an example imaging sequence 500 according to example embodiments of the present disclosure. As described herein, the sensor 202 moves along the track direction, and thus moves relative to a region of interest to be observed. The sensor captures image frames successively at a specified frame rate (frames per second or fps) and/or integration time. As the sensor moves and captures image frames, every point in a region of interest is captured at least once by each spectral filter (and/or panchromatic filter). In example implementations, the sensor movement may or may not be aligned with the motion of a moving overhead platform.

As depicted in FIG. 4, images 409a-409h represent a sequence of eight successive image frames captured by a sensor scanning over a region of interest. For instance, image sequence 500 can be captured using a sensor corresponding to staring sensor 300 shown in FIG. 2. In this example, a panchromatic channel is not used. As shown, the sensor captures eight image frames, corresponding to capture times (CT) 1-8. The individual sensor captures are denoted by a capital letter for the filter strip (from A to D) followed by a number for the capture time. For example, sensor capture D3 in image CT3 represents the capture by the spectral strip D, 305d, in the third capture time.

Each image frame can be captured by the image capture device using a designated integration time. As described above, the integration times can be determined based at least in part on an SNR objective. For instance, in some implementations, the integration times for each captured image frame can be specified in an exposure profile. The exposure profile can include predetermined integration times for each image frame to be captured. In this manner, the integration times can be changed or varied over time to correspond to each successive capture time. In some implementations, one or more integration times can correspond to one or more portions of the imaging sensor. For instance, each spectral strip can have a designated integration time. In this manner, capturing image frames can include exposing each portion of the imaging sensor in accordance with the respective integration times. In implementations wherein the imaging sensor includes a panchromatic portion adjacent to the multispectral portion, the panchromatic block can also have one or more designated integration times.

In some implementations, after collection, all of the images can be co-registered. Once co-registration is completed, a separate reconstructed spectral image can be created for each color (spectral) band. The reconstructed color band images can be combined to create a multispectral image. In cases where the staring sensor includes a panchromatic sensor in addition to the multispectral sensor, captured panchromatic image data may be used to enhance the quality of a multispectral image. In some implementations, the images can be combined based at least in part on the SNR objective. For instance, the images can be combined in a manner that yields a desired SNR curve.

Figure 5:
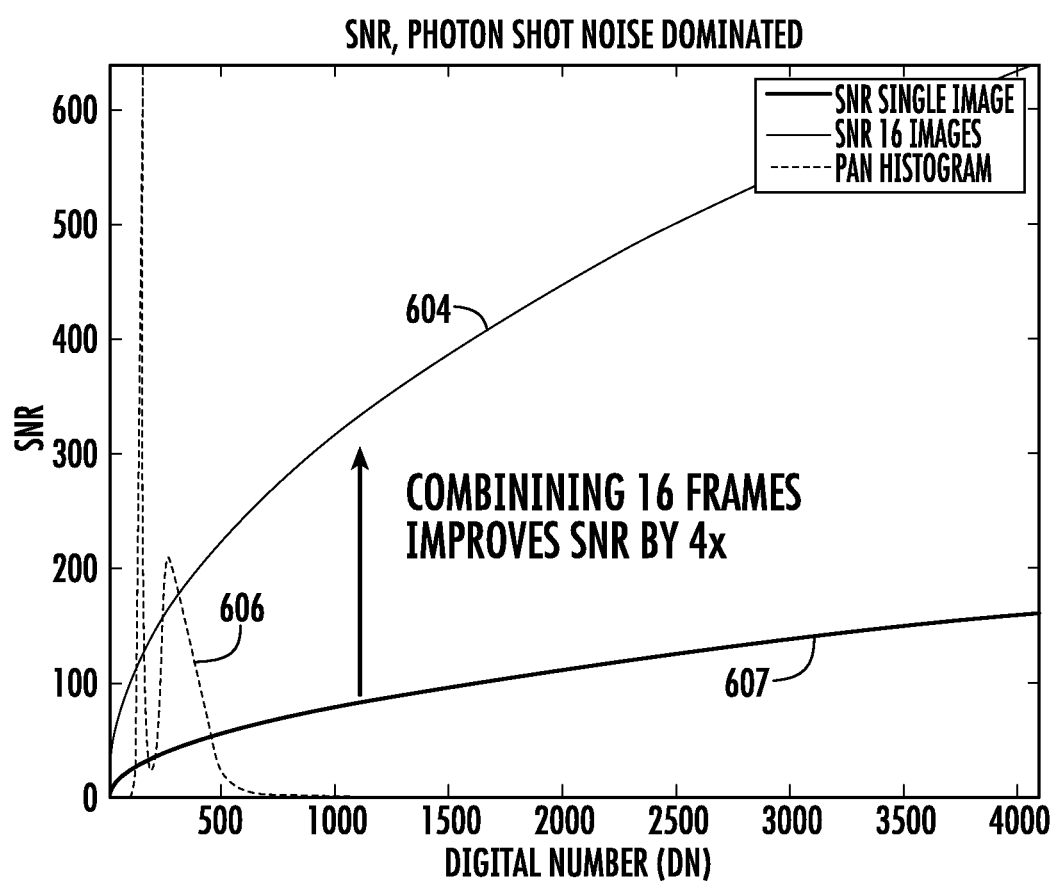
FIGS. 5-6 depict plots of example SNR responses according to example embodiments of the present disclosure.

FIG. 5 depicts example SNR curves 602, 604 according to example embodiments of the present disclosure. In particular, SNR curves 602, 604 provide a representation of signal-to-noise ratio as a function of scene brightness (measured in digital numbers). SNR curve 602 corresponds to a single image. SNR curve 604 corresponds to an SNR curve yielded from a combination of 16 image frames captured using identical integration times. FIG. 5 further depicts SNR curves 602, 604 overlaid against a PAN histogram 606 associated with a region of interest. As shown by the histogram 606, the majority of the data captured by the image capture devices corresponds to a low SNR. In this manner, increasing SNR in darker regions (as in SNR curve 604) can improve image quality in the darker regions. As shown, SNR curve 602 provides a low SNR in darker regions of an image. SNR curve 604 provides an increased SNR relative to SNR curve 602. In this manner, SNR curve 604 may provide a better SNR in darker regions of the image, but may provide an SNR that is unnecessarily high in brighter regions.

Figure 6:
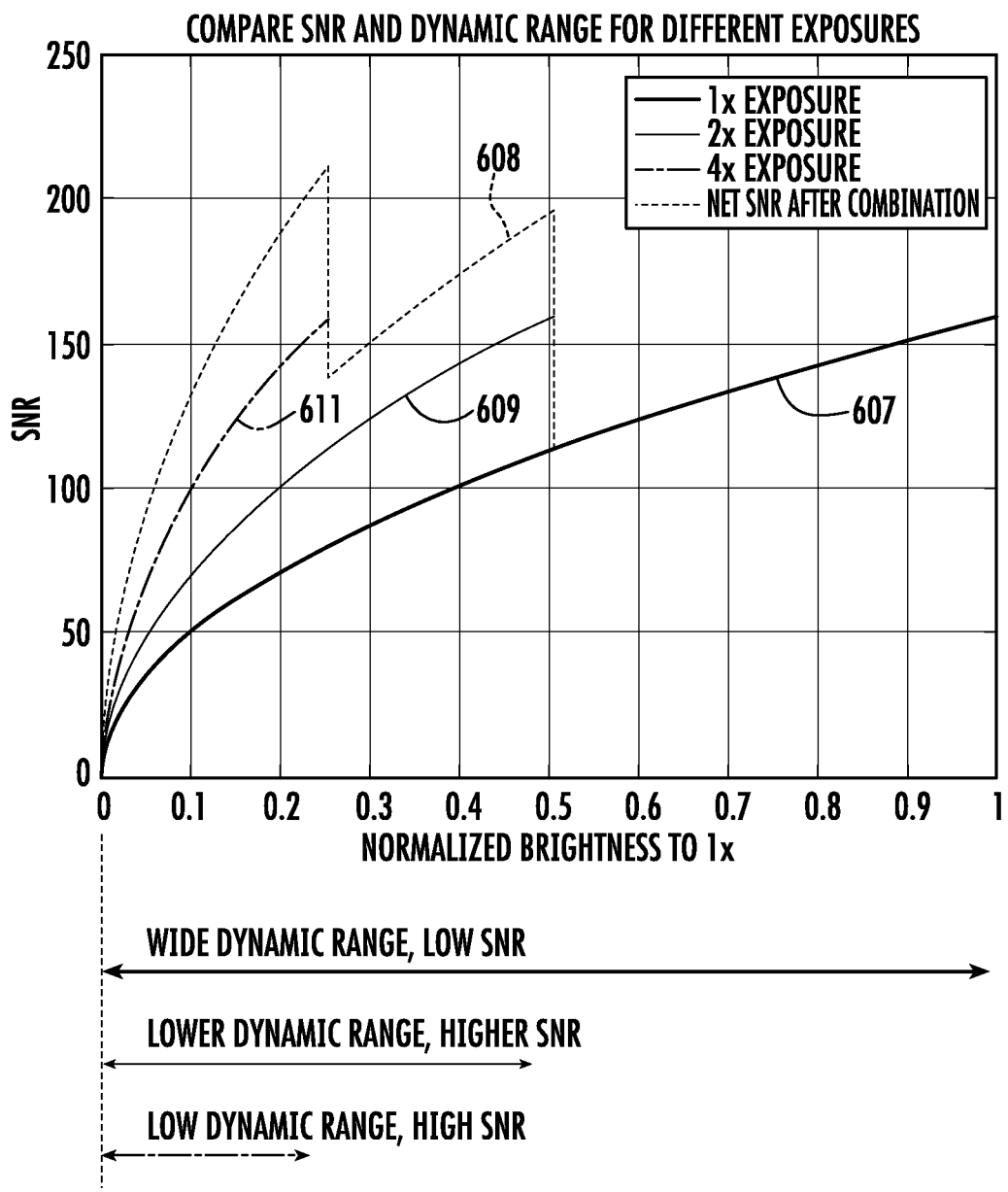

As described above, multiple integration times can be combined to shape a SNR curve as a function of scene brightness. For instance, FIG. 6 depicts an example SNR curve 608 corresponding to an image created by combining multiple image frames. In particular, SNR curve 608 can correspond to an image created by combining an image frame captured at a baseline integration time (1× exposure) having an SNR curve 607, an image frame captured at twice the baseline integration time (2× exposure) having an SNR curve 609, and an image frame captured at four times the baseline integration time (4× exposure) having an SNR curve 611. As shown, SNR in an image is proportional to the square root of the integration time use to capture the image. As further shown, dynamic range of the image is inversely proportional to the length of the integration time. In this manner, SNR associated with the combined image can be shaped based at least in part on the integration times used to capture the image frames.

Figure 7:
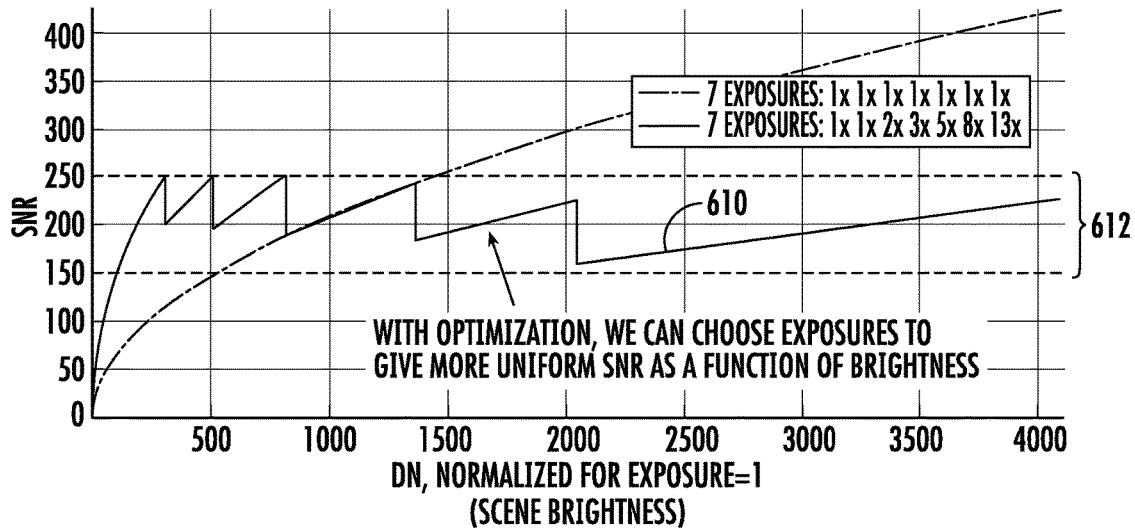
FIGS. 7-8 depict plots of example SNR responses determined based on SNR objectives according to example embodiments of the present disclosure.

As described above, in some implementations, an SNR curve of a combined image can be shaped in accordance with a predetermined SNR objective. The SNR curve can be shaped based at least in part on the integration times used to capture the individual image frames, and/or based at least in part on the combination of the image frames. For instance, FIG. 7 depicts a plot of an example SNR curve 610 according to example embodiments of the present disclosure. In particular, the SNR curve 610 can be shaped in accordance with an SNR objective 612 of maintaining a substantially uniform SNR. For instance, the SNR objective 612 can include maintaining the SNR within a threshold range for some range of brightness. In this manner, a plurality of integration times can be determined based at least in part on the SNR objective 612. For instance, as shown in FIG. 7, seven integration times (1×, 1×, 2×, 3×, 5×, 8×, and 13×) are used to capture a plurality of image frames.

Figure 8:
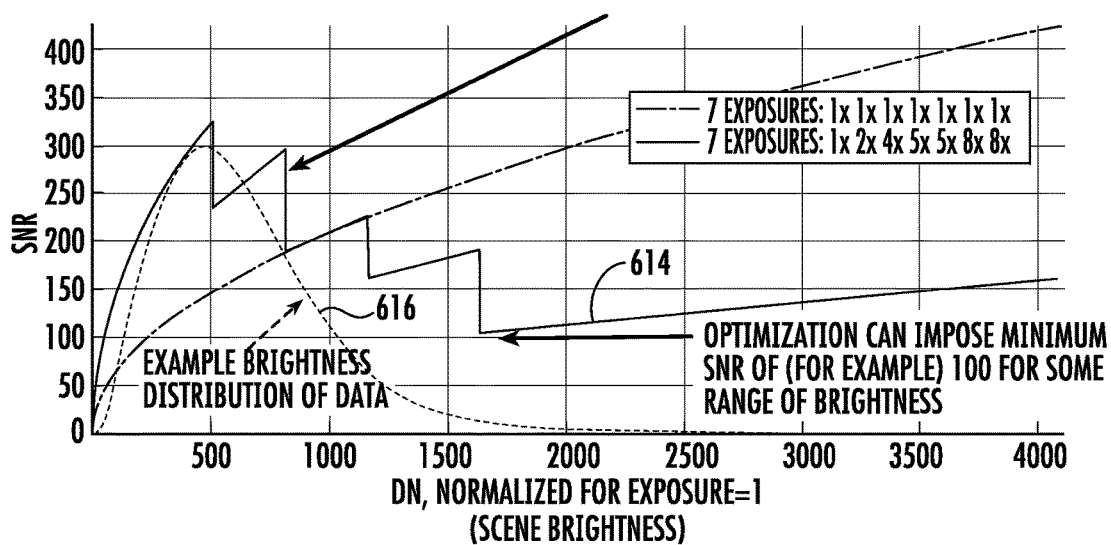

As another example, FIG. 8 depicts an SNR curve 614 determined in accordance with an SNR objective 616 of approximately tracking a brightness distribution associated with a region of interest. As described above, in some implementations, the brightness distribution can be predetermined based at least in part on location of the imaging platform, location of the sun, expected brightness of the region of interest, etc. In some implementations, the brightness distribution can be determined concurrently with the image acquisition, for instance, by analyzing image frames captured in the current image acquisition. FIG. 8 further depicts an SNR objective of maintaining the SNR above a minimum SNR for some range of brightness. In this manner, integration times can be determined in accordance with multiple SNR objectives.

Figure 9:
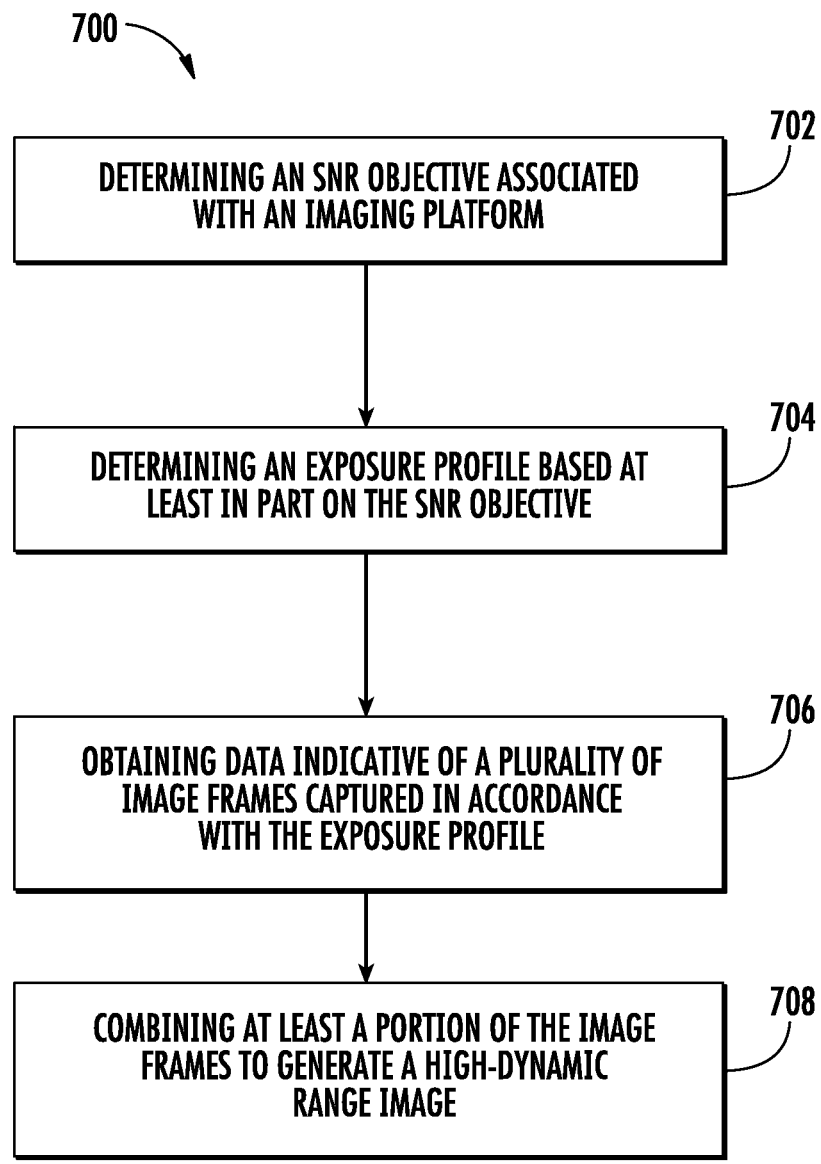
FIG. 9 depicts a flow diagram of an example method of creating high-dynamic range images by shaping an SNR curve according to example embodiments of the present disclosure.

FIG. 9 depicts a flow diagram of an example method (700) of generating images according to example embodiments of the present disclosure. Method (700) can be implemented by one or more computing devices, such as one or more of the computing devices depicted in FIG. 11. In addition, FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (702), method (700) can include determining an SNR objective associated with an imaging platform. As described above, the SNR objective can be associated with one or more desired SNR properties. For instance, the SNR objective can be to shape an SNR curve in accordance with a brightness distribution, a minimum SNR, an SNR range, etc.

At (704), method (700) can include determining an exposure profile associated with the imaging platform based at least in part on the SNR objective. For instance, the exposure profile can include one or more integration times to be used in capturing a plurality of image frames of a region of interest. In some implementations, the exposure profile can specify an integration time for each image frame to be captured. In this manner, the exposure profile can provide for integration times that change over time as the imaging platform captures image frames. In some implementations, the exposure profile can be determined based at least in part on one or more filters (e.g. spectral filters, neutral density filters, and/or panchromatic filters) associated with the image capture device. In some implementations an exposure profile can be determined for one or more portions of an imaging sensor. For instance, a first exposure profile can be determined for a panchromatic portion of the imaging sensor, and a second exposure profile can be determined for a multispectral portion of the imaging sensor. In this manner, each portion of the imaging sensor can be configured to capture image frames using different integration times.

At (706), method (700) can include obtaining data indicative of a plurality of image frames. Each image frame can depict at least a portion of the region of interest. Each image frame can be captured by the imaging platform in accordance with the exposure profile(s). For instance, capturing an image frame can include exposing at least a portion of the imaging sensor for the designated integration time specified by the exposure profile. As indicated above, the image frames may be captured in a successive manner, such that neighboring image frames contain overlapping portions.

At (708), method (700) can include combining at least a portion of the image frames to generate a high-dynamic range image. In some implementations, the image frames can be co-registered prior to combining. The image frames can be combined based at least in part on the SNR objective. For instance, the image frames can be combined to yield a desired SNR behavior.

Figure 10:
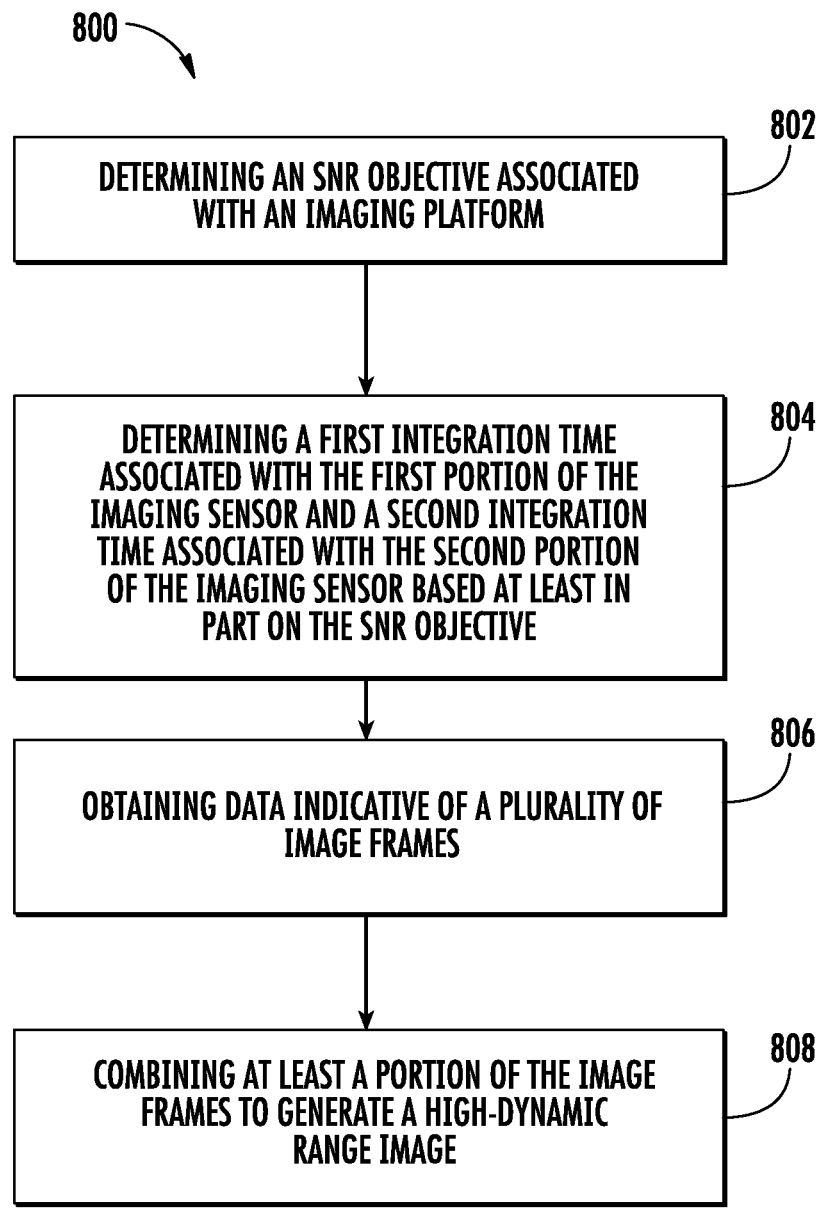
FIG. 10 depicts a flow diagram of an example method of creating high-dynamic range images according to example embodiments of the present disclosure.

FIG. 10 depicts a flow diagram of an example method (800) of generating an image according to example embodiments of the present disclosure. At (802), method (800) can include determining an SNR objective associated with an imaging platform. At (804), method (800) can include determining a first integration time associated with a first portion of an imaging sensor and a second integration time associated with a second portion of the imaging sensor. In some implementations, the first and second integration times can be determined based at least in part on the SNR objective. In some implementations, the first and second integration times can be determined based at least in part on one or more filters associated with the first and second portions of the imaging sensor. For instance, as described above, the first and second integration times can be determined such that highlight areas associated with the region of interest will saturate in image frames captured by a panchromatic portion of the imaging sensor, but will not saturate in the spectral portions of the imaging sensor. As another example, the first and second integration times can be determined such that highlight areas associated with the region of interest will saturate in image frames captured by a panchromatic portion of the imaging sensor, but will not saturate in the neutral density portions of the imaging sensor. It will be appreciated that the first and second integration times may be the same integration times, or may be different.

In some implementations, the first and second integration times can be determined as part of one or more exposure profiles. For instance, an exposure profile can be determined for each portion of the imaging sensor. The exposure profile can specify one or more integration times to be used in capturing image frames.

At (806), method (800) can include obtaining data indicative of a plurality of image frames in accordance with the first and second integration times. For instance, an image frame can be captured by the first portion of the imaging sensor by exposing the first portion of the imaging sensor for the first integration time. An image frame can be captured by the second portion of the imaging sensor by exposing the second portion of the imaging sensor for the second integration time. In various implementations the first and second portions of the imaging sensor can be exposed simultaneously or in a serial manner.

At (808), method (800) can include combining at least a portion of the image frames to generate a high-dynamic range image. For instance as indicated above, the images can be combined based at least in part on the SNR objective.

Figure 11:
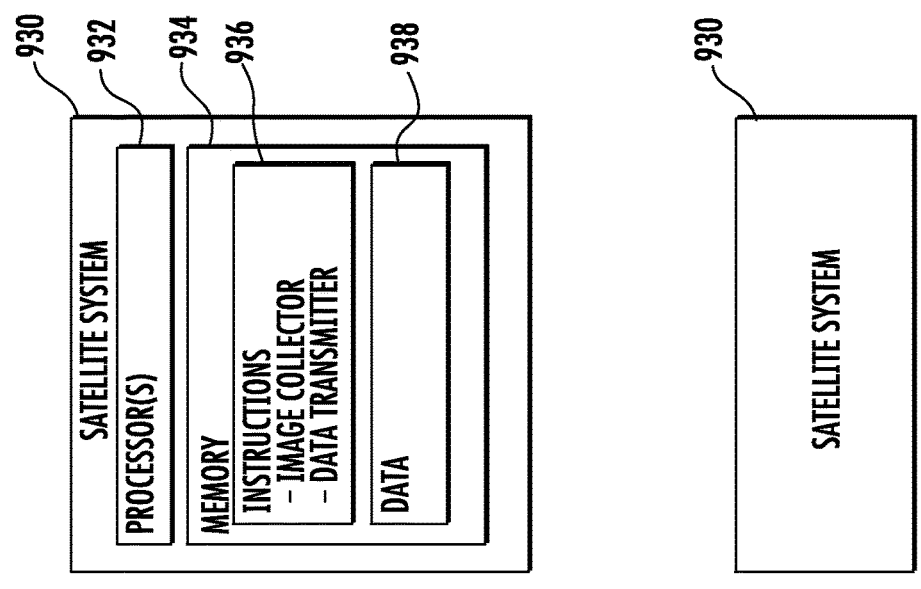
FIG. 11 depicts an example system according to example embodiments of the present disclosure.
Figure 11:
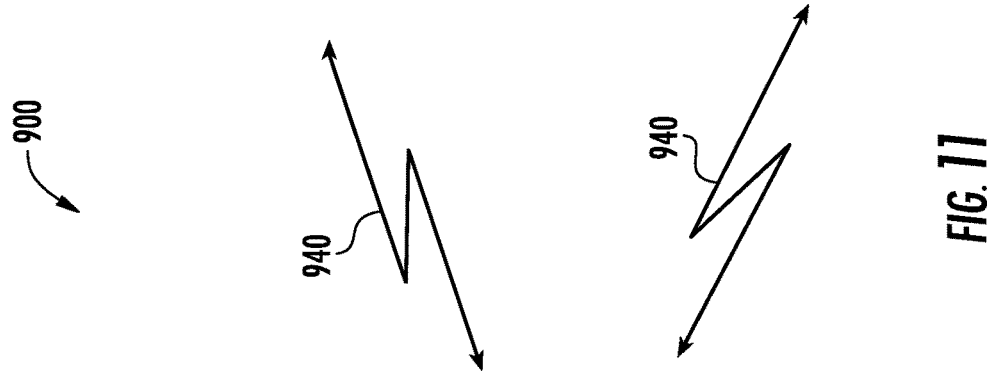
Figure 11:
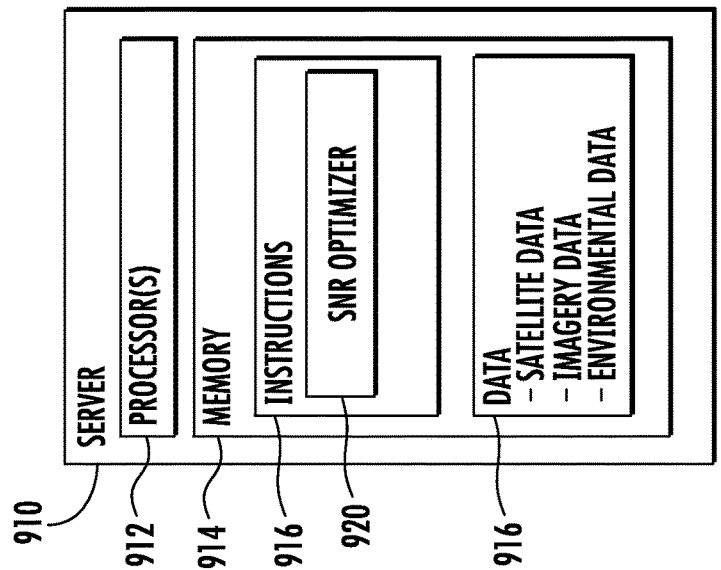

FIG. 11 depicts an example computing system 900 that can be used to implement the methods and systems according to example aspects of the present disclosure. The system 900 can be implemented using a client-server architecture that includes a server 910 that communicates with one or more satellite systems 930 using radio frequency transmission signals 940. The system 900 can be implemented using other suitable architectures, such as a single computing device.

The system 900 includes a server 910. The server 910 can be associated with a control system for providing control commands to one or more satellite systems 930. The server 910 can be implemented using any suitable computing device(s). The server 910 can have one or more processors 912 and one or more memory devices 914. The server 910 can also include a communication interface used to communicate with one or more satellite systems 930 over the network 940. The communication interface can include any suitable components for communicating with one or more satellite systems 930, including for example, transmitters, receivers, ports, controllers, antennas, or other suitable components.

The one or more processors 912 can include any suitable processing device, such as a microprocessor, microcontroller, integrated circuit, logic device, or other suitable processing device. The one or more memory devices 914 can include one or more computer-readable media, including, but not limited to, non-transitory computer-readable media, RAM, ROM, hard drives, flash drives, or other memory devices. The one or more memory devices 914 can store information accessible by the one or more processors 912, including computer-readable instructions 916 that can be executed by the one or more processors 912. The instructions 916 can be any set of instructions that when executed by the one or more processors 912, cause the one or more processors 912 to perform operations. For instance, the instructions 916 can be executed by the one or more processors 912 to implement an SNR optimizer 920. SNR optimizer 920 can be configured to determine an SNR objective associated with capturing a plurality of image frames depicting a region of interest, and determining one or more integration times to be used in capturing the image frames based at least in part on the SNR objective.

As shown in FIG. 11, the one or more memory devices 914 can also store data 918 that can be retrieved, manipulated, created, or stored by the one or more processors 912. The data 918 can include, for instance, satellite data, imagery data, environmental data and other data. The data 918 can be stored in one or more databases. The one or more databases can be connected to the server 910 by a high bandwidth LAN or WAN, or can also be connected to server 910 through various other suitable networks. The one or more databases can be split up so that they are located in multiple locales.

The server 910 can exchange data with one or more satellite systems 930 using radio frequency transmissions signals 940. Although two satellite systems 930 are illustrated in FIG. 11, any number of satellite systems 930 can be configured to communicate the server 910. Each of the satellite systems 930 can be any suitable type of satellite system, including satellites, mini-satellites, micro-satellites, nano-satellites, etc. In some implementations, satellite system 930 can be an aircraft or other imaging platform such as an airplane, a helicopter, an unmanned aerial vehicle, a drone, a balloon, or other suitable aircraft.

Similar to the server 910, a satellite system 930 can include one or more processor(s) 932 and a memory 934. The one or more processor(s) 932 can include one or more central processing units (CPUs). The memory 934 can include one or more computer-readable media and can store information accessible by the one or more processors 932, including instructions 936 that can be executed by the one or more processors 932 and data 938. For instance, the memory 934 can store instructions 936 for implementing an image collector and a data transmitter configured to capture a plurality of image frames and to transmit the plurality of image frames to a remote computing device (e.g. server 910). In some implementations, aspects of SNR optimizer 920 may be implemented within satellite system 930. For instance, various aspects of SNR optimizer 920 may be implemented within satellite system 930 instead of or in addition to various aspects of SNR optimizer 920 being implemented within server 910.

The satellite system 930 can also include a communication interface used to communicate with one or more remote computing devices (e.g. server 910) using radio frequency transmission signals 940. The communication interface can include any suitable components for interfacing with one more remote computing devices, including for example, transmitters, receivers, ports, controllers, antennas, or other suitable components.

In some implementations, one or more aspects of communication among satellite system 930, server 910, and/or a ground communication station may involve communication through a network. In such implementations, the network can be any type of communications network, such as a local area network (e.g. intranet), wide area network (e.g. Internet), cellular network, or some combination thereof. The network can also include a direct connection between a satellite system 930 and the server 910. In general, communication through the network can be carried via a network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of creating high-dynamic range images, the method comprising:
    determining, by one or more computing devices, a signal-to-noise ratio objective associated with an imaging platform configured to capture one or more images region of interest, the signal-to-noise ratio objective specifying a desired signal-to-noise behavior as a function of a brightness of the region of interest,
        wherein the signal-to-noise ratio objective is to shape a signal-to-noise ratio curve based at least in part on a brightness distribution, the one or more computing devices determining the brightness distribution based at least in part on a location of the imaging platform, a location of the sun relative to the earth, an albedo associated with the region of interest, atmospheric absorption, an expected reflectance of one or more targets within the region of interest, or expected atmospheric conditions;
    determining, by the one or more computing devices, an exposure profile associated with the imaging platform based at least in part on the signal-to-noise ratio objective;
    obtaining, by the one or more computing devices, data indicative of a plurality of image frames, each depicting at least a portion of the region of interest, the plurality of image frames being captured by the imaging platform in accordance with the exposure profile; and
    generating, by the one or more computing devices, a high-dynamic range of at least a portion of the region of interest based at least in part on the plurality of image frames.

2. The computer-implemented method of claim 1, wherein the exposure profile comprises a plurality of integrations times to be used in capturing the plurality of image frames.

3. The computer-implemented method of claim 2, wherein the exposure profile specifies an integration time for each image frame to be captured.

4. The computer-implemented method of claim 2, wherein the plurality of integration times are determined to shape a signal-to-noise ratio curve in accordance with the signal-to-noise ratio objective.

5. The computer-implemented method of claim 2, wherein each image frame of the plurality of image frames is captured using a different integration time from the exposure profile.

6. The computer-implemented method of claim 1, wherein capturing, by the one or more computing devices, a plurality of image frames depicting the region of interest comprises scanning the region of interest using a two-dimensional image sensor.

7. The computer-implemented method of claim 5, wherein the two-dimensional image sensor is a two-dimensional staring sensor configured to capture a two-dimensional image frame in a single snapshot.

8. The computer-implemented method of claim 6, wherein the two-dimensional staring sensor comprises a complementary metal-oxide-semiconductor sensor, a charge coupled device sensor, or an active-pixel sensor.

9. The computer-implemented method of claim 1, wherein the signal-to-noise ratio objective is to maintain a signal-to-noise ratio curve within a predetermined threshold range.

10. The computer-implemented method of claim 1, wherein the brightness distribution is determined prior to capturing the plurality of image frames.

11. The computer-implemented method of claim 1, wherein determining, by the one or more computing devices, a brightness distribution associated with the region of interest comprises determining a brightness distribution associated with at least one image frame of the plurality of image frames.

12. A computing system, comprising: one or more processors; and
    one or more memory devices, the one or more memory devices storing computer-readable instructions that when executed by the one or more processors cause the one or more processors to perform operations, the operations comprising:
        determining a signal-to-noise ratio objective associated with an imaging platform configured to capture one or more images of a region of interest, the signal-to-noise ratio objective specifying a desired signal-to-noise curve as a function of a brightness of the region of interest,
            wherein the signal-to-noise ratio objective is to shape the signal-to-noise ratio curve based at least in part on a brightness distribution, the one or more computing devices determining the brightness distribution based at least in part on a location of the imaging platform, a location of the sun relative to the earth, an expected reflectance of one or more targets within the region of interest, or expected atmospheric conditions;

determining, by the one or more computing devices, an exposure profile associated with the imaging platform based at least in part on the signal-to-noise ratio objective;

obtaining, by the one or more computing devices, data indicative of a plurality of image frames, each depicting at least a portion of the region of interest, the plurality of image frames being captured by the imaging platform in accordance with the exposure profile; and generating, by the one or more computing devices, a high-dynamic range of at least a portion of the region of interest based at least in part on the plurality of image frames.

13. The computing system of claim 12, wherein the exposure profile comprises a plurality of integrations times to be used in capturing the plurality of image frames.

14. One or more tangible, non-transitory computer-readable media storing computer-readable instructions that when executed by one or more processors cause the one or more processors to perform operations, the operations comprising:

determining a signal-to-noise ratio objective associated with an imaging platform configured to capture one or more images of a region of interest, the signal-to-noise ratio objective specifying a desired signal-to-noise curve as a function of a brightness of the region of interest, wherein the signal-to-noise ratio objective is to shape a signal-to-noise ratio curve based at least in part on a brightness distribution, the one or more computing devices determining the brightness distribution based at least in part on a location of the imaging platform, a location of the sun relative to the earth, an expected reflectance of one or more targets within the region of interest, or expected atmospheric conditions;

determining, by the one or more computing devices, an exposure profile associated with the imaging platform based at least in part on the signal-to-noise ratio objective;

obtaining, by the one or more computing devices, data indicative of a plurality of image frames, each depicting at least a portion of the region of interest, the plurality of image frames being captured by the imaging platform in accordance with the exposure profile; and generating, by the one or more computing devices, a high-dynamic range of at least a portion of the region of interest based at least in part on the plurality of image frames.

\* \* \* \* \*